United States Patent
Holland et al.

(10) Patent No.: US 6,818,091 B1
(45) Date of Patent: Nov. 16, 2004

(54) CUT AND PUNCTURE RESISTANT LAMINATED FABRIC

(75) Inventors: John E. Holland, Bailey, NC (US); David V. Cunningham, Rocky Mount, NC (US); Connie W. Holland, Bailey, NC (US)

(73) Assignee: JHRG, LLC, Spring Hope, NC (US)

( * ) Notice: Subject to any disclaimer, the term of this patent is extended or adjusted under 35 U.S.C. 154(b) by 0 days.

(21) Appl. No.: 08/957,431

(22) Filed: Oct. 24, 1997

(51) Int. Cl.⁷ .............................................. B32B 31/20
(52) U.S. Cl. .................... 156/309.6; 156/192
(58) Field of Search .................. 156/308.2, 309.6, 156/192, 311; 442/304

(56) References Cited

U.S. PATENT DOCUMENTS

| | | | |
|---|---|---|---|
| 3,558,423 A | * | 1/1971 | Rossetti ...................... 156/311 |
| 3,657,042 A | * | 4/1972 | Rerolle et al. ............... 156/192 |
| 4,424,253 A | * | 1/1984 | Anderson .................... 428/215 |
| 4,597,818 A | | 7/1986 | Aoyama et al. |
| 4,894,281 A | * | 1/1990 | Yagi et al. .................. 442/304 |
| 4,957,804 A | | 9/1990 | Hendrix et al. |
| 4,983,433 A | | 1/1991 | Shirasaki |
| 5,160,472 A | | 11/1992 | Zachariades |
| 5,160,767 A | | 11/1992 | Genske et al. |
| 5,169,697 A | | 12/1992 | Langley et al. |
| 5,248,364 A | | 9/1993 | Liu et al. |
| 5,266,390 A | | 11/1993 | Garland |
| 5,284,540 A | | 2/1994 | Roth et al. |
| 5,286,576 A | | 2/1994 | Srail et al. |
| 5,389,448 A | | 2/1995 | Schirmer et al. |
| 5,443,874 A | | 8/1995 | Tachi et al. |
| 5,445,883 A | | 8/1995 | Kobayashi et al. |
| 5,460,884 A | | 10/1995 | Kobylivker et al. |
| 5,547,536 A | * | 8/1996 | Park ........................... 156/292 |
| 5,567,498 A | * | 10/1996 | McCarter et al. ........... 428/113 |
| 5,789,327 A | * | 8/1998 | Rousseau .................... 442/135 |

FOREIGN PATENT DOCUMENTS

DE    4441842 A1    6/1995

* cited by examiner

*Primary Examiner*—Blaine Copenheaver
*Assistant Examiner*—John L. Goff
(74) *Attorney, Agent, or Firm*—Womble Carlyle Sandridge & Rice, PLLC; Lewis Rowell

(57) ABSTRACT

The invention relates to a process for making a puncture resistant laminated fabric comprising laminating a layer of polyethylene film to a layer of fabric comprised of an ultra high molecular weight polyethylene. The laminating step is conducted at a temperature between about 230° F. and about 290° F. with a contact time of between about 5 minutes and about 15 minutes with the application of a laminating pressure of between about 50 psi and about 500 psi.

5 Claims, 1 Drawing Sheet

CUT AND PUNCTURE RESISTANT LAMINATED FABRIC

FIELD OF THE INVENTION

The present invention relates to laminated materials and the process for their production. The laminates have a layer of polyethylene bonded to a layer of an ultra-high molecular weight polyethylene high performance fiber. More particularly, the present invention relates to a method of producing a laminate by bonding a layer of a thermoplastic film such as polyethylene or ethylene vinyl acetate (EVA) to a layer of a strong, lightweight fabric constructed of a high performance fiber such as long chain expanded polyethylene fibers.

BACKGROUND OF THE INVENTION

High performance fabrics have been used for a number of applications where tear-resistance, abrasion-resistance, cut- and stab-resistance, and chemical- and cold-resistance are important. As used herein, the term "high performance" refers to fabrics constructed from a group of fibers used to make cut-resistant, and abrasion resistant articles such as gloves and aprons. The high strength-to-weight ratios of these fabrics can provide properties having significant improvements in the performance characteristics stated above at a fraction of the weight of other alternatives. It would be desirable to combine the advantages of high performance fabrics with film-laminated fabrics currently used for applications such as cargo container covers and side curtains for side-access trucks. These items typically are constructed from vinyl-coated nylon or similar materials which do not exhibit these high performance characteristics. The vinyl coating is provided for the purpose of creating an impervious barrier to air and fluid penetration. The disadvantages of currently available vinyl-coated nylon or polyester fabric materials is their relative lack of durability and relatively higher weight per unit area. Thus, it would be desirable to take advantage of the high strength and low weight characteristics of high performance fabrics for these applications. An successful lamination process for these fabrics would enhance their abrasion resistance. It is believed that no successful process has been developed for the economical lamination of high performance fabrics with a thermoplastic film such as polyethylene or EVA to create a more durable, waterproof, cut and wear resistant laminate.

SUMMARY OF THE INVENTION

The present invention relates to the heat lamination of a thermoplastic films to fabrics constructed of arrangements of fabrics constructed of high performance fibers such as high tenacity, high modulus, ultrahigh molecular weight polyethylene fibers. Various applications and potential applications of fabrics constructed of high strength polyethylene fibers require a flexible, light weight coating to prevent the penetration of the fabric by fluids, chemicals and particles. These applications require the high strength-to-weight of the high performance, polyethylene fiber fabrics and consequently require a coating that is equally lightweight. In addition the coating must stretch with the fabric and is required to be tough, abrasion resistant chemically resistant, well adhered and durable. Previously, high strength polyethylene fibers have not been coated or laminated with conventional coatings or films due to their extremely low functionality and highly crystalline structure. There are no bonding sites to chemically bond adhesives or coatings.

The method of the present invention includes making a cut and puncture resistant laminated fabric comprising laminating a layer of thermoplastic film to a layer of fabric comprised of a high performance yarn. The laminating step is conducted at a temperature between about 230° F. and about 290° F. with a contact time of between about 5 minutes and about 4 to 8 hours with the application of a laminating pressure of between about 50 psi and about 500 psi. The thermoplastic film may be comprised of a material selected from the group consisting of high density polyethylene, low density polyethylene and ethylene vinyl acetate. The high performance fiber is comprised of a material selected from the group consisting of extended chain polyethylene, ultra high molecular weight polyethylene, and aramid.

Thus one aspect of the present invention is to provide an economical method for lamninating a high performance fabric.

Another aspect of the present invention is to provide a method for making a lightweight sheet material having superior wear characteristics.

These and other aspects of the present invention will become apparent to those skilled in the art after a reading of the following description of the preferred embodiments when considered in conjunction with the drawings.

BRIEF DESCRIPTION OF THE DRAWING(S)

DETAILED DESCRIPTION OF THE PREFERRED EMBODIMENTS

Figure 1:
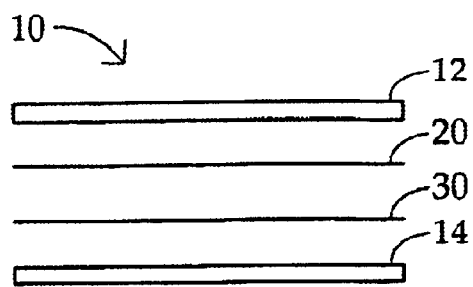
FIG. 1 is a schematic representation of a hydraulic press used for the lamination process of the present invention.

As used herein, the term "fabric" includes plain weave fabrics constructed using convention weaving techniques as well as knit fabrics again constructed using common knitting techniques. This term also includes felts of either single or multiple layers.

The term "fiber" as used herein refers to a fundamental component used in the assembly of yarns and fabrics. Generally a fiber is a component which has a length dimension which is much greater than its diameter or width. This term includes monofilament, multi-filament, ribbon, strip, staple, and other forms of chopped, cut or discontinuous fiber and the like having a regular or irregular crossection. "Fiber" also includes a plurality of any one of the above or a combination of the above.

The cross-sectional shapes of fibers suitable for the practice of the present invention include circular, flat or oblong. They may also be of irregular or regular multi-lobal cross-section having one or more regular or irregular lobes projecting from the linear or longitudinal axis of the filament.

As used herein the terms laminate and laminating refer to the application of a flexible film to a fabric construction.

It has been found that polyethylene and EVA films adhere well to fabrics constructed from high performance polyethylene fibers without the use of a bonding agent given sufficient heat, time and pressure. While the actual mechanism of bonding has not been identified, it is believed to involve more than the forcing of the film into the interstices of the fabric construction. Polyethylene films applied to polyethylene fibers adhere sufficiently so that the force required to remove the film from the fabric exceeds the strength of the film. After initial lamination, continued heat treatment improves the adhesion, suggesting that the lower density polyethylene film is diffusing into the crystalline structure of the high performance fibers. The adhesion of the EVA film to the fabric is much more difficult to characterize due to the low strength of the film. It may be similar to the polyethylene film because of the ethylene content of the film. However. The EVA film tears when an attempt is made to determine film strength even when one edge of the film protrudes past the fabric edge.

As an additional benefit, the film can be pigmented to provide a color to one side of the fabric or the firm can be used as the substrate in the normal processes for printing on polyethylene film.

It is believed that polyethylene film will not adhere satisfactorily to woven fabrics constructed from aramid or liquid crystal polymer high performance fibers. Attempts to create a polyethylene or EVA laminated product using those fabric fibers in a woven fabric construction have been unsuccessful with the film delaminating as a continuous layer after working a section of the film free from the fabric by mechanical action such as rubbing or twisting the laminate. However, for knit, felt or similar fabric structures, better results have been obtained.

The construction of the high strength, polyethylene fibers can be in the form of a predetermined plurality of fibers arranged in a predetermined configuration or a plurality of fibers grouped together to form twisted or untwisted yarns which are arranged in a predetermined configuration. For example, they may be formed as a woven fabric, a knit fabric of various constructions including circular knits and raschel knits, or a needle punch or a wet laid felt.

Suitable high tenacity, high modulus fibers are solution-drawn, ultrahigh molecular weight (UHWM) polyethylene fibers, such as those sold under the brand names Spectra®, Dyneema® and Tekmilon®. Melt spun polyethylene fibers with a tenacity of 15 grams per denier, such as Certran® fibers, can be laminated but do not appear to exhibit the same film adhesion as do the more crystalline fibers.

Any suitable polyethylene or EVA film can be used as the laminating film. High-density polyethylene, low-density polyethylene and linear low-density polyethylene are suitable for use in the practice of the present invention. Low-density polyethylene and EVA films loaded with fire retardant and low density films with pigments have been used also. As illustrated in the examples below, the time, temperature and pressure variables vary for each of the films.

The film to fabric mechanism of adhesion is not completely understood but is believed to involve more than the forcing of the film into the interstices of fabric construction. PE films applied to PE fibers adhere sufficiently so that the force required to remove the film from the fabric exceeds the strength of the film. After the initial lamination, continued heat treatment for up to about six hours continues to improve adhesion, suggesting that the lower density PE film is diffusing into the crystalline structure of the high performance polyethylene fibers. PE films will not adhere satisfactorily to woven fabrics fabricated from high performance fibers such as aramid fibers or liquid crystal polymers. Performance with knit aramid or liquid crystal polymer fabrics is expected to be better.

The practice of the present invention may also include the use of other fabric structures such as knit or felt. Both of these structures have a thick construction relative to the fiber diameter and possess many openings between the fibers in all directions. The polyethylene or EVA film can be adhered to this structure by heat and pressure over time. The film may be laminated only to the surface of the fabric or the film may migrate into the internal structure of the fabric. The film in such structures provides a waterproof and chemically resistant barrier to penetration.

The method for the lamination of the film to the fiber construction is through the application of heat and pressure to the film/fabric for a given time. The pressure applied may vary from that generated merely by rolling the fabric and film into a tight roll to about 300 psi as disclosed in Dickson et al. discussed above. Temperatures may vary from a low of about 220° F. to about 285 F. Process time may vary from about five minutes at higher temperatures to about two days at very low temperatures. As the process temperature is increased, process time is reduced. Conversely, at lower process temperatures, the time required to create a usable film to fabric bond increases rapidly. For a given temperature, higher pressures decreases the time required for lamination in all cases.

An apparatus for the practice of the present invention is illustrated schematically in FIG. 1 which shows a hydraulic flat press 10. Positioned between the upper 12 and lower 14 press members is a layer of polyethylene (PE) film 20 and a fabric sheet 30 of a high-strength, polyethylene fiber. The press members 12, 14 clamp the PE film 20 and the fabric 30 under varying conditions of heat, pressure and time. A suitable press for the practice of the present invention is the Wabash model MPI V50H-18-BC. The practice of the present invention also includes the use as necessary of a suitable "release paper" between the layers being laminated and the press platens. This term is understood in the art to refer to any one of a number of different materials other than paper such as mylar or polyester used to shield the items being laminated from direct contact with the hot press platen.

Figure 2:
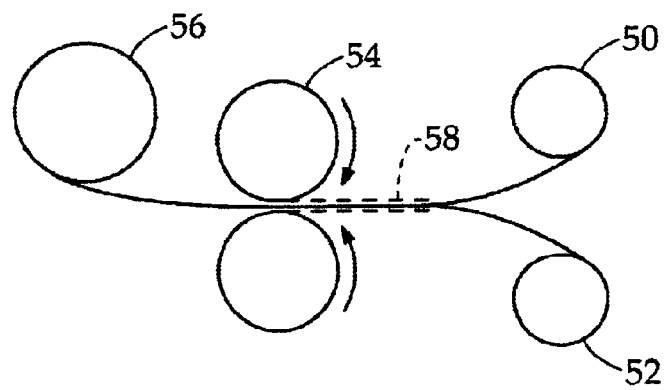
FIG. 2 is a schematic representation of a three step process for making a laminated fabric according to the present invention.

Alternatively, the lamination process of the present invention may be conducted using a three-step process as illustrated in FIG. 2. The first step includes first tacking the thermoplastic film 50 to the fabric construction 52 on a continuous basis using a calender roll 54 to form a lightly laminate material. That is, the film is adhered to the fabric uniformly but can be separated therefrom easily. In this condition the laminated material is not suitable for the proposed end uses contemplated for the present invention. A release paper 58 may be used if desired. A suitable machine is the Van Vlandrin Silk Calender with a husk soft roll and a heated steel center roll. Older versions of this machine are steam heated and have provision for modifying the amount of pressure applied to the film/fabric combination. After the tacking step, sections of the continuous roll are wound tightly into a bundle 56 with appropriate release paper and secured with heat resistant tape. Next, the bundle is baked in an oven for between about 2 hours and about 5 hours at a temperature between about 200 degrees Fahrenheit and about 275 degrees Fahrenheit. In this embodiment pressure is applied to the film/fabric in two steps, first at a relatively high pressure for a short duration and second at a much lower pressure for a much longer duration.

It should be noted the other types of machines may be employed for the tacking step. For example, a hydraulic press may be used to tack sheet material in a batch-type process. The scope of the present invention includes adapting other textiles process machinery as needed to achieve the required process conditions described herein.

Figure 3:
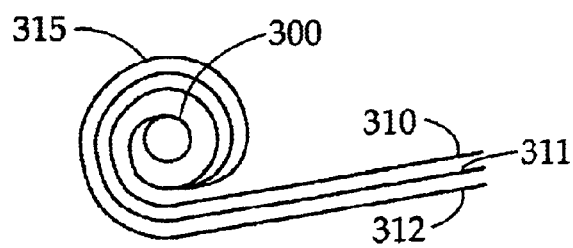
FIG. 3 is a schematic representation of an alternative lamination process wherein the laminate and fabric are wound tightly around a core.

In a preferred embodiment illustrated in FIG. 3 the fabric 312 and film 311 are tightly rolled onto a core 300 with a release paper 310 to form a bundle 315. The resulting bundle 315 is then heated to about between 240° F. and about 280° F. for a period of between about 2 hours and about 2–3 days. Preferably, the heat treatment is conducted at a temperature of about 265° F. for about four to about six hours. Here the only pressure applied to the bundle is that generated by the winding process. The exact amount of pressure is unknown but is believed to be under 50 psi. Extra pressure beyond that generated by the act of forming the bundle may be applied during the heat treatment but is not required for acceptable results.

The laminates of the present invention may also be made using machines designed for other purposes. By way of non-limiting example, the apparatus disclosed in U.S. Pat. No. 5,401,344 to Dickson et al for producing rolls of wrinkle free composite sheet material may be used. Dickson discloses a curing apparatus including a cylinder with an internally lined inflatable bladder. The cylinder is adaptable to be moved into surrounding relation with a sheet material. A forming roll is arranged to supply heat from the interior of the assembled wraps of material while the surrounding inflated bladder exerts pressure to cure a ballistics-type material over a pre-determined cure cycle. The practice of the present invention does not involve a "curing" time per se. However, the ability to provide a controlled heating step and wrinkle-free final product are useful for the practice of the present invention. The content of the Dickson patent is incorporated herein by reference in its entirety.

The following examples demonstrate the advantages and unexpected results of the present invention. The specific process parameters, i.e., temperature, pressure, time and materials illustrate the invention in an exemplary fashion and should not be construed as limiting the scope of the invention. The style designations used in the examples are well-known product references commonly used in the art.

EXAMPLE 1

A laminated fabric was produced by pressing a 17×17, plain weave fabric, style 902, woven from 1200 denier by weight Spectra® 900 yarn and with a 8 mil. thick, low density polyethylene film produced by Blueridge Films, Inc. in a hydraulic press for five minutes at a temperature of 230 degrees Fahrenheit at 50 pounds per square inch. The film was lightly but uniformly adhered to the fabric at this time. The fabric was further treated in an oven at a temperature of approximately 250 degrees Fahrenheit for four hours. After cooling the film could not be loosened from the fabric and the film adhesion exceeded the tensile strength of the film.

EXAMPLE 2

A laminated fabric was produced by laminating a 34×34, plain weave fabric, style 904 woven from 650 denier weight Spectra 900 yarn to a 4 mil. thick, low density polyethylene film produced by Mid South Extrusion, Inc. using a Van Viandrin calender roll normally used for fabric finishing. The unheated roll of the calender had a soft surface while the hot roll was steel. The temperature of the hot roll was 300 degrees Fahrenheit and the speed of the laminate moving through the calender was approximately 15 meters per minute. Pressure was unmeasured but was the maximum available, thus producing quite high pressure at the narrow nip point. The film was lightly but uniformly adhered to the fabric at this time. The fabric was further treated in an oven at a temperature of approximately 250 degrees Fahrenheit for four hours. After cooling, the film could not be separated from the fabric and the film adhesion exceeded the tensile strength of the film.

EXAMPLE 3

Example 3 used the same calender roll first step as Example 2. Then the laminate was heat treated by one pass through a Marshall & Williams M.S.D. 5503, serial pin tenter frame. The fabric was pinned to the sides of the tenter frame track and tensioned. The oven temperature was 250 degrees Fahrenheit and the residence time in the frame was 45 seconds. The laminate thus produced exhibited excellent adhesion and could not be separated.

EXAMPLE 4

A laminated fabric was produced by pressing a 34×34, plain weave fabric, style 904 woven from 650 denier weight Spectra® 900 yarn and a 8 mil. thick, low density polyethylene film produced by Blueridge Films, Inc. in a hydraulic press. The press temperature was 280 degrees Fahrenheit and the pressure was 150 PSI. The time under pressure and heat was five minutes. The press was opened without cooling. The film could not be loosened from the fabric and the film adhesion exceeded the tensile strength of the film at this time. Fabric properties were unaffected by the temperature exposure as measured by the tensile properties of the fabric.

EXAMPLE 5

A laminated fabric was produced by pressing a 34×34, plain weave fabric, style 904 woven from 650 denier weight Spectra® 900 yarn and an 8 mil thickness (two 4 mil layers) of high density polyethylene film produced by Mid South Extrusion, Inc. in a hydraulic press. The press temperature was 290 degrees Fahrenheit and the pressure was 416 PSI. The process time was five minutes. The press was opened after cooling to 250 degrees Fahrenheit. The film could not be loosened from the fabric and the film adhesion exceeded the tensile strength of the film at this time. Fabric properties were unaffected by the temperature exposure as measured by the tensile properties of the fabric.

EXAMPLE 6

A laminated fabric was made by pressing a Spectra® felt, Style 4834 and a 4 mil., high density polyethylene film produced by Mid South Extrusion, Inc. in a hydraulic press. The press temperature was 292 degrees Fahrenheit and the pressure was 416 PSI. The process time was five minutes. The press was opened after cooling to 250 degrees Fahrenheit. The film was driven into the film by the heat and pressure producing one homogeneous layer. The film could not be separated from the fibers.

EXAMPLE 7

A laminate fabric was prepared by laminating a two layer Spectra® felt, Style 5813 with 24 mils. of low density polyethylene film produced by Mid South Extrusion, Inc. in a hydraulic press. The press temperature was 290 degrees Fahrenheit and the pressure was 500 PSI. Process time was five minutes. The press was opened after cooling to 250 degrees Fahrenheit. The film was driven into the felt by the heat and pressure producing one homogeneous layer. The film could not be separated from the fibers.

EXAMPLE 8

A laminated fabric was made by laminating one layer of a 2 ounce per square yard spun lace Kevlar, Type Z-11 with an 8 mil thickness (2 four mil layers) of a black, low density polyethylene film produced by Blueridge Films, Inc. in a hydraulic press. The press temperature was 290 degrees Fahrenheit and the pressure was 150 PSI. Process time was five minutes. The press was opened without cooling. The film had completely penetrated the material and the resulting laminate could not be penetrated by water. The film could not be removed from the yarn structure, but the adhesion of the film to the Kevlar was poor as witnessed by the poor tear strength and puncture resistance.

EXAMPLE 9

A laminate was produced by laminating a 12.5 ounce per square yard circular knit fabric comprised of 360 denier weight Certran fiber produced by Hoechst Celanese with an 8 mil thickness (2 four mil layers) of black, low density PE film produced by Blueridge Films, Inc. in a hydraulic press. The press temperature was 250 degrees Fahrenheit and the pressure was 150 PSI. Process time was five minutes. The press was opened without cooling. The film had completely penetrated the material and the resulting laminate could not be penetrated by water. The film could not be removed from the fabric structure.

EXAMPLE 10

A laminated fabric was fabricated by laminating a circular knit fabric comprised of a 16 ounce circular knit fabric knitted from 400 denier weight Vectran fiber produced by Hoechst Celanese with an 8 mil thickness (2 four-mil layers) of black, low density PE film produced by Blueridge Films, Inc. in a hydraulic press. The press temperature was 250 degrees Fahrenheit and the pressure was 150 PSI. Process time was five minutes. The press was opened without cooling. The film had completely penetrated the material and the resulting laminate could not be penetrated by water. The film could not be removed from the yarn structure, but the adhesion of the film to the Vectran was poor as witnessed by the poor puncture resistance.

EXAMPLE 11

A 32×32 plain weave fabric composed of a 375 denier weight Spectra® 1000 yarn was laminated with a 0.35 mil low density polyethylene film produced by Raven Industries in a hydraulic press. The pressure was 150 PSI, the press temperature was 250 degrees Fahrenheit and process time was five minutes. The press was opened without cooling. The film was adhered to the fabric but could be stripped away.

EXAMPLE 12

A laminated fabric was fabricated by pressing a 34×34 plain weave Kevlar 129 fabric, style 704 (scoured but not treated) and 8 mil. of black, low density PE film produced, by Blueridge Films, Inc., in a hydraulic press. The press temperature was 250 degrees Fahrenheit and the pressure was 150 PSI. The time under pressure and heat was twenty-five minutes. The press was opened after cooling to 180 degrees Fahrenheit After cooling the film appeared adhered to the fabric, but could be stripped away after the fabric was worked.

EXAMPLE 13

A 16 inch wide strip of Spectra® fiber fabric, style 904, and an 8 mil thick low density polyethylene film produced by Blueridge Films and a 0.5 mil polyester release paper were rolled tightly together using a modified pattern machine. The machine was an Econo-Copier/2000 manufactured by Perforated Pattern, Co., Inc. The tightly wound roll was wrapped with heat resistant tape and heated in an oven at 250 degrees Fahrenheit for seven hours. When the bundle was removed from the oven, it was observed that the film had adhered to the fabric with a strength that exceeded the strength of the film. The film could not be removed from the fabric with simple mechanical action. Additionally, the finished product exhibited a permanent texture resulting from the compression of the fabric layers making up the bundle. The texture is preferred for some applications as it increases flexibility, hides defects and imparts an aesthetically pleasing surface to the film side of the laminate.

EXAMPLE 14

An EVA film manufactured by Deerfield Urethane, Inc. was laminated to a fabric made from Allied Signal's extended chain polyethylene fiber (Spectra® 900). The yarn was 1200 denier by weight and the fabric construction was 17×17 plain weave construction, style 902. The film was initially tacked to the fabric using a hand iron and the resulting laminate was heated in an oven for three hours at 220 F. Film adhesion to the fabric exceeded the strength of the film.

EXAMPLE 15

An EVA film manufactured by Deerfield Urethane, Inc. was laminated to a fabric made from Allied Signal's extended chain polyethylene fiber (Spectra® 900). The yarn was 650 denier by weight and the fabric construction was 34×34 plain weave construction, style 904. The fabric and film were laminated in the equipment described in the Dickson et al patent at 265 F. and 150 PSI. The film adhered well to the fabric and could not be removed.

EXAMPLE 16

A Spectra® fabric, style 902, and a 8 mil. thick, low density polyethylene film produced by Blueridge Films, Inc. were laminated together in the equipment described in the Dickson et al. patent at 265 F. and 150 PSI. The film adhered well to the fabric and could not be removed.

EXAMPLE 17

An EVA film manufactured by Deerfield Urethane, Inc. was laminated to a fabric made from Allied Signal's extended chain polyethylene fiber (Spectra® 900). The yarn was 650 denier by weight and the fabric and film along with a 0.5 mil. polyester release film were hand rolled on a cardboard tube. Hand tension was maintained on the fabric and the release paper while the tube was rolled by a third individual. The completed rolled was taped with high temperature tape and the roll heat soaked at 250 F for 4.5 hours. The film could not be removed from the fabric after the heat soak.

In examples 1–12 and 14 above excellent results were obtained using small pieces (less than 24"×24") of fabric. However, for larger scale production, the bundle method illustrated by Example 13 is more desirable.

Well known methods for manufacturing laminated products using Spectra® fabrics teach away from the high process temperatures described above. In fact, machining and processing literature from Allied Signal, the manufacturer of Spectra® fibers recommends that process temperature be kept below 150° F. without pressure and that Spectra® fibers fabric should be pressed at higher temperatures only while a constant pressure is maintained. Allied Signal recommends that the item be cooled to 150° F. before removing processing pressure.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What is claimed is:

1. A method for making an impervious cut and puncture resistant laminated fabric, comprising:
   (a) selecting a fabric formed of high performance yarns, the yarns being selected from the group consisting of extended chain polyethylene, ultra high molecular weight polyethylene, and aramid and having a denier between about 360 and 1,200, the fabric having first and second sides;
   (b) positioning a thermoplastic film over at least one of the first and second sides of the fabric, the thermoplastic film being selected from the group consisting of high density polyethylene, low density polyethylene, and ethylene vinyl acetate and having a thickness of less than about 24 mils;
   (c) applying a pressure of between about 50 psi and 500 psi to the fabric and thermoplastic film at a temperature of between about 230 degrees Fahrenheit and 290 degrees Fahrenheit; and
   (d) maintaining the pressure and temperature for between about 5 minutes and 15 minutes so that the thermoplastic film softens and bonds with the fabric.

2. The method of claim 1 further including the step of tacking the thermoplastic film over at least one of the first and second sides of the fabric before step (c).

3. The method of claim 2 wherein the tacking step is conducted using a heated calender roll device.

4. The method of claim 2 wherein the tacking step is conducted using a heated flat press.

5. The method of claim 1 wherein the step of applying pressure to the fabric is conducted using a hydraulic press.

* * * * *